(No Model.)  6 Sheets—Sheet 1.

G. S. HEATH.
SPEED INDICATOR.

No. 378,836.  Patented Feb. 28, 1888.

Witnesses
Chas. J. Williamson
Henry C. Hazard

Inventor
George S. Heath, by
Rindle & Russell, his Attys (No Model.) 6 Sheets—Sheet 2.

G. S. HEATH.
SPEED INDICATOR.

No. 378,836. Patented Feb. 28, 1888.

Witnesses
Chas. J. Williamson.
Henry C. Hazard.

Inventor,
George S. Heath, by
Rindle & Russell, his Attys (No Model.) 6 Sheets—Sheet 3.
G. S. HEATH.
SPEED INDICATOR.

No. 378,836. Patented Feb. 28, 1888.

Witnesses:
Chas. J. Williamson.
Henry C. Hazard.

Inventor:
George S. Heath, by
Crindle & Russell, his Atty's (No Model.) 6 Sheets—Sheet 4.

G. S. HEATH.
SPEED INDICATOR.

No. 378,836. Patented Feb. 28, 1888.

Witnesses:
Chas. J. Williamson.
Henry C. Hazard.

Inventor:
George S. Heath, by
Crindle and Russell, his Attys.

(No Model.)  6 Sheets—Sheet 5.

G. S. HEATH.
SPEED INDICATOR.

No. 378,836. Patented Feb. 28, 1888.

Witnesses
Chas. J. Williamson
Henry C. Hazard

Inventor:
George S. Heath, by
Pindle and Russell, his Attys (No Model.) 6 Sheets—Sheet 6.

G. S. HEATH.
SPEED INDICATOR.

No. 378,836. Patented Feb. 28, 1888.

Witnesses:
Chas. J. Williamson.
Henry C. Hazard.

Inventor:
George S. Heath by
Crindle and Russell, his Attys

N. PETERS, Photo-Lithographer, Washington, D. C.

UNITED STATES PATENT OFFICE.

GEORGE S. HEATH, OF HARTFORD, CONNECTICUT.

SPEED-INDICATOR.

SPECIFICATION forming part of Letters Patent No. 378,836, dated February 28, 1888.

Application filed January 20, 1887. Serial No. 224,858. (No model.)

*To all whom it may concern:*

Be it known that I, GEORGE S. HEATH, of Hartford, in the county of Hartford, and in the State of Connecticut, have invented certain new and useful Improvements in Speed-Indicators; and I do hereby declare that the following is a full, clear, and exact description thereof, reference being had to the accompanying drawings, in which—

Figure 1:
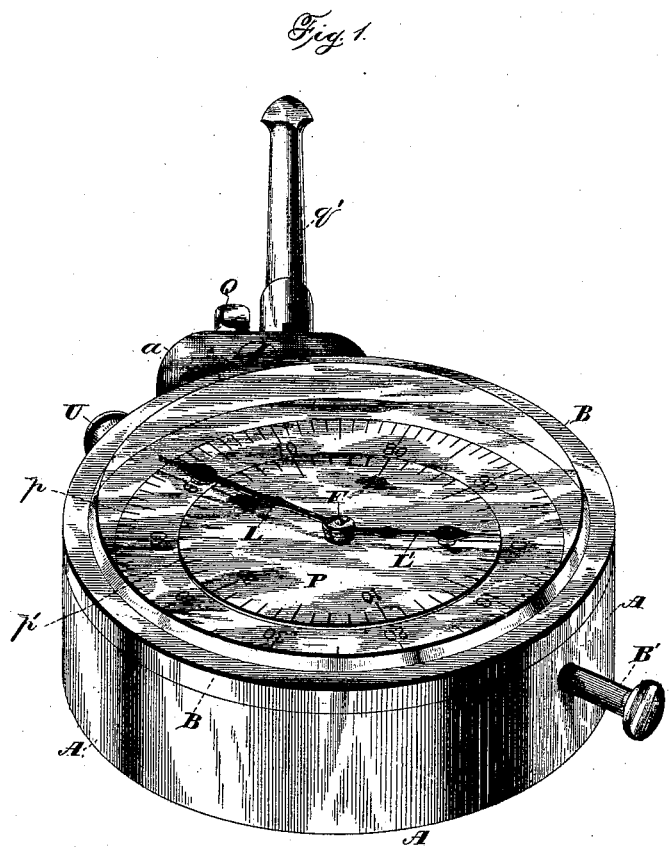
Figure 2:
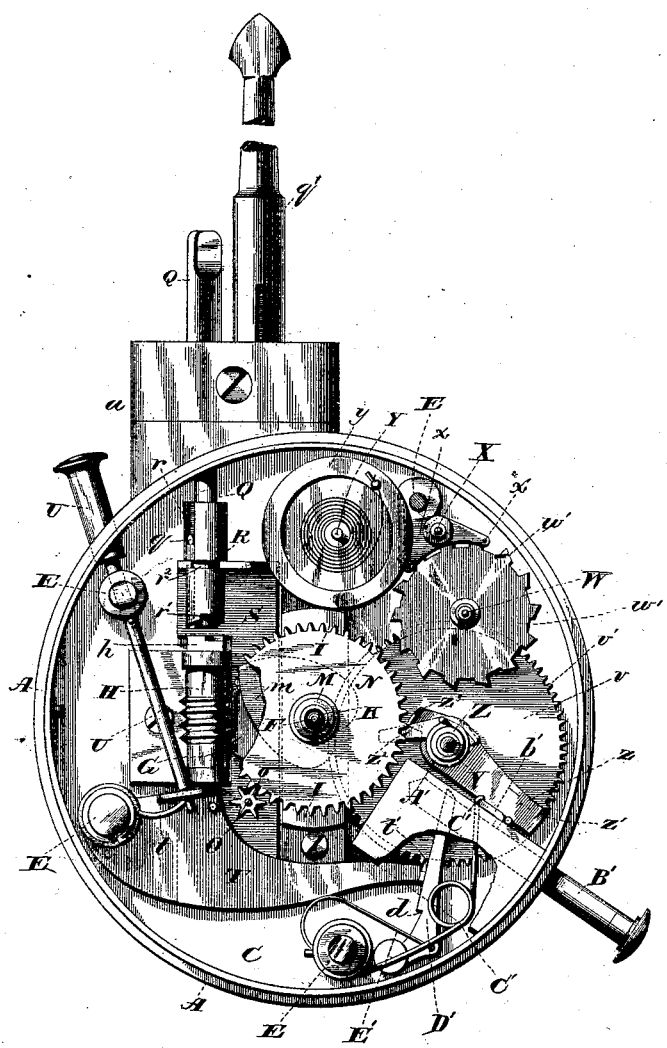
Figure 3:
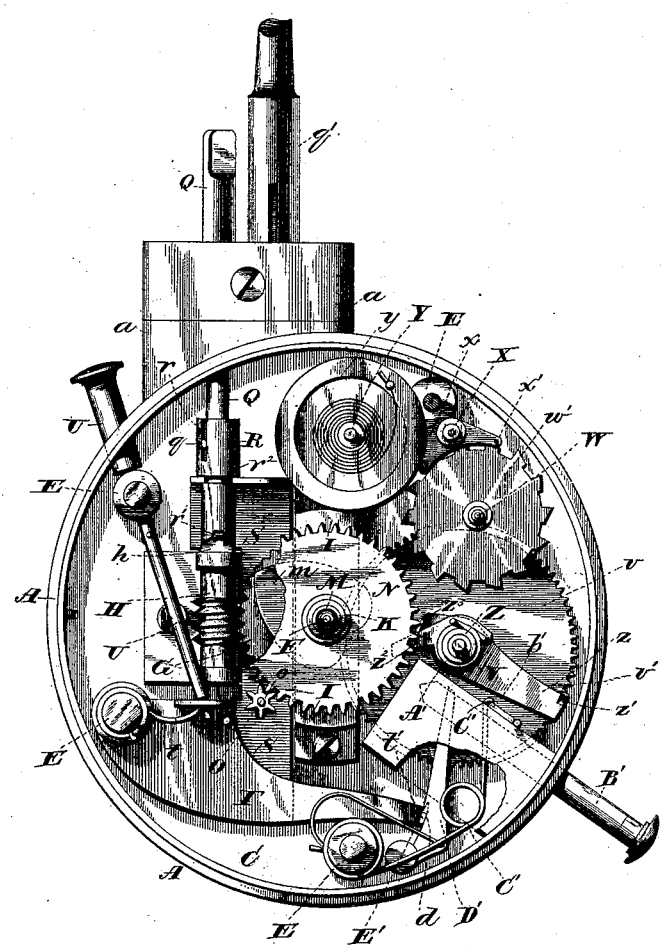
Figure 4:
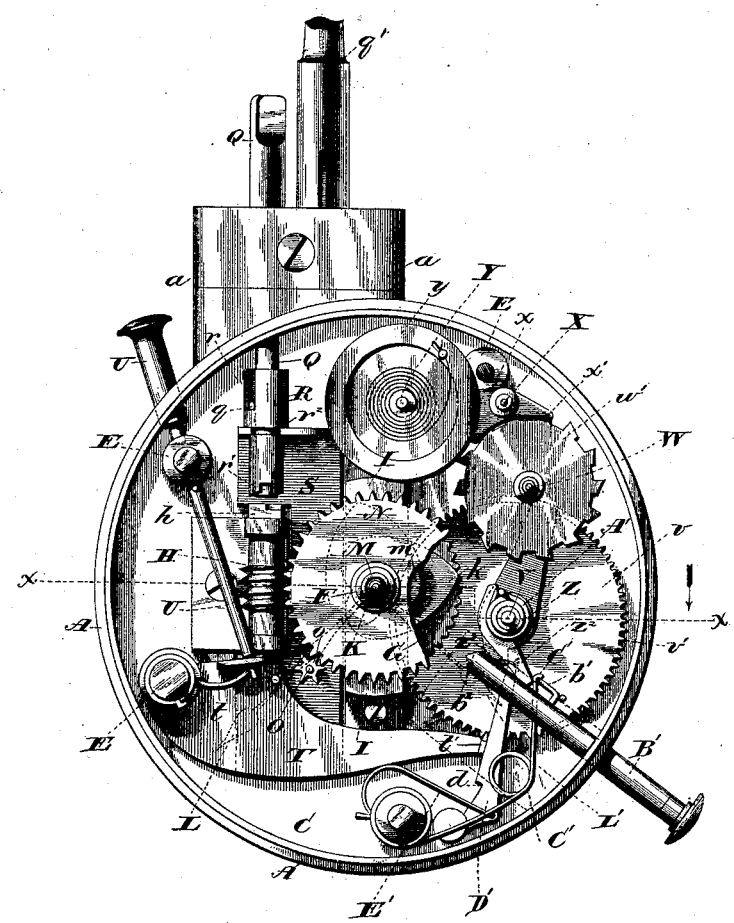
Figure 5:
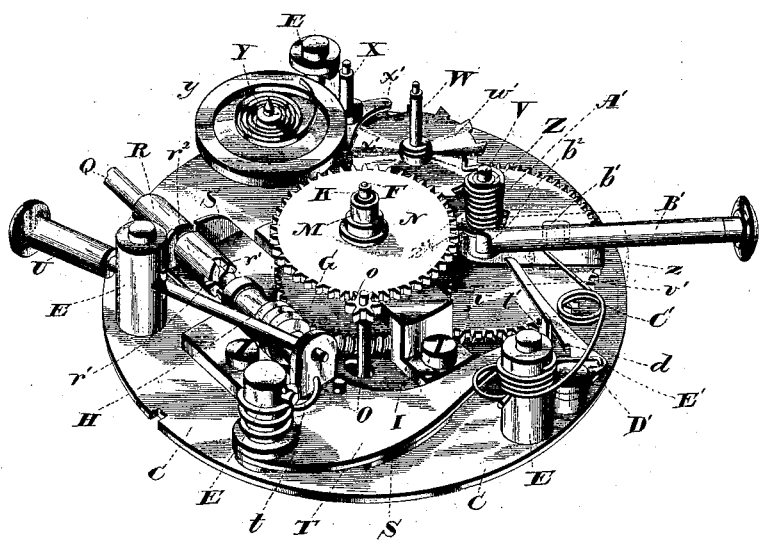
Figure 6:
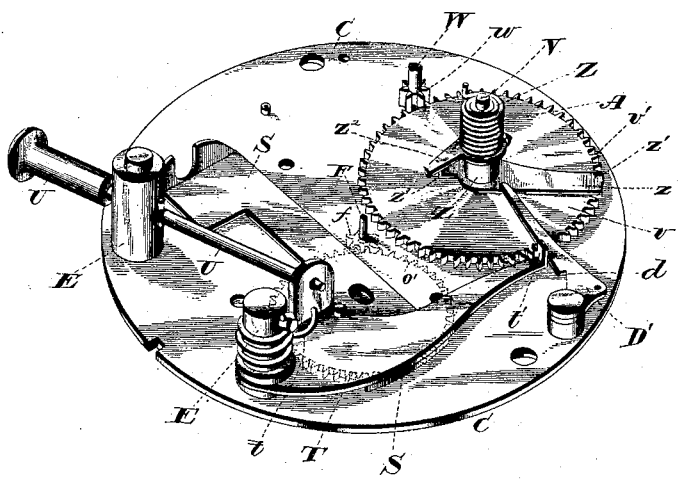
Figure 7:
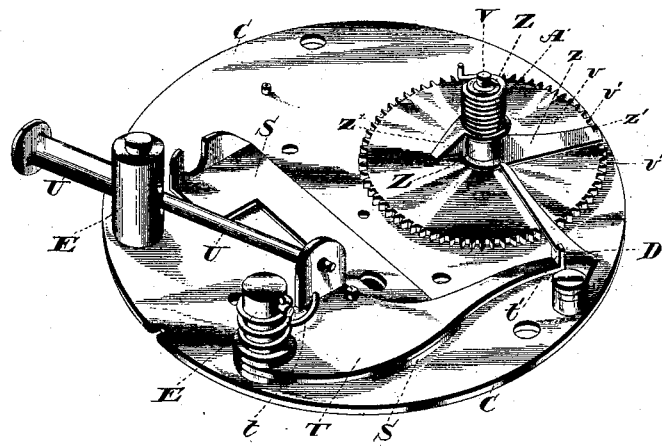
Figure 8:
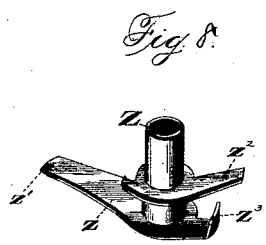
Figure 9:
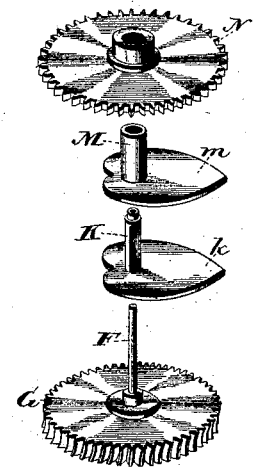
Figures 10, 12:
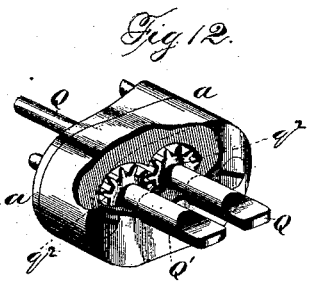
Figure 11:
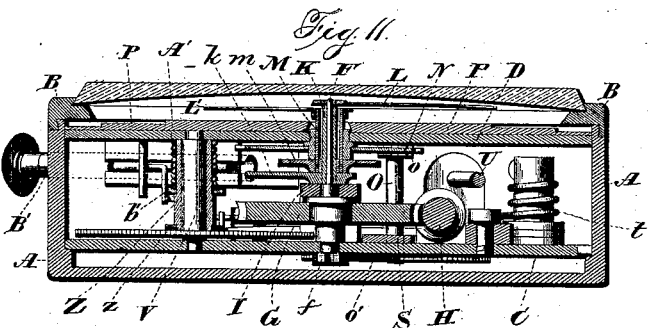

Figure 1 is a perspective view of my device as arranged for use. Fig. 2 is a plan view of the same with the dial and top plate removed to show the operative mechanism, the parts being in their normal positions. Fig. 3 is a like view of said device, and shows the relative positions of parts when the time-train and registering mechanism have been started. Fig. 4 is a plan view of the same, and shows the relative positions of parts after the time-train has stopped and before the hands have been set back to zero. Fig. 5 is a perspective view of the time-train and registering mechanism separated from the case and with the dial and front plate removed. Fig. 6 is a like view of the starting and stopping devices when occupying their normal positions. Fig. 7 is a like view of the same when arranged to permit the registering and time mechanisms to act. Fig. 8 is an enlarged perspective view of the spring-pressed ratchet-bar for giving motion to the time-train. Fig. 9 is a like view of the cam-sleeves for carrying the hands, separated from each other and from the center arbor. Fig. 10 is a perspective view of the same when arranged for use. Fig. 11 is a section upon line *x x* of Fig. 4; and Fig. 12 is a perspective view of the rotating spindles, a portion of their housing being broken away to show their geared connection.

Letters of like name and kind refer to like parts in each of the figures.

The design of my invention is to enable the number of revolutions of a shaft or other rotating part to be easily and accurately determined for any given time; and to this end such invention consists, principally, in a speed-indicator in which are combined mechanism for registering the rotations of a spindle, mechanism for measuring time, and mechanism whereby, by the manipulation of one device, the registering-hands may be set at zero and the actuating-spring of the time-measuring mechanism simultaneously placed under tension, substantially as and for the purpose hereinafter specified.

It consists, further, in a speed-indicator in which are mechanisms for registering the rotations of a spindle and for measuring time, in combination with mechanism that, by the manipulation of one device, is adapted to simultaneously set the registering-hands at zero and to place under tension the spring employed for actuating the time-measuring mechanism, substantially as and for the purpose hereinafter shown.

It consists, further, in a speed-indicator which is provided with a spindle that is adapted to have its outer end engaged with a shaft or other part to be timed, and may be connected with and caused to actuate registering mechanism, in combination with a second similar spindle which is arranged parallel with said first spindle and connected therewith by gearing, whereby when either spindle is rotated the other spindle will move simultaneously and with equal speed in the opposite direction, substantially as and for the purpose hereinafter set forth.

It consists, finally, in the special construction and combination of parts, substantially as and for the purpose hereinafter shown and described.

In the carrying of my invention into practice I employ a casing, A, which has, preferably, the form of a short cylinder with one of its sides closed and its opposite side inclosed by a glazed bezel, B.

Within the case A is a movement-frame composed of two plates, C and D, that are connected together and held in relative position in the usual manner by means of three pillars, E and E. At the center of said frame is journaled an arbor, F, which at or near its lower end carries a toothed wheel, G, that is engaged by a threaded spindle or worm, H, which is journaled within suitable bearings at one side of said shaft, the arrangement being such that the rotation of said spindle will cause said wheel and arbor to revolve. The upper end of said arbor passes loosely through an opening in the front plate, D, while it is held in position by means of a bridge, I, which is secured upon the back plate, C, and journals said arbor immediately above the wheel G.

Journaled upon the arbor F, above the bridge I, is a sleeve, K, which has secured to its inner end a heart-shaped cam, k, and at its outer end is adapted to receive a hand, L, and is held by friction with sufficient firmness upon said arbor to cause it to revolve therewith, while free to be moved independently thereon when sufficient force is applied to the cam. Around said sleeve is journaled a second sleeve, M, which at its inner end is provided with a heart-shaped cam, m, and at its outer end is adapted to receive a hand, L', and immediately above said cam has journaled a toothed wheel, N, that is held in engagement therewith by friction, as in case of said sleeve K and arbor F.

At one side of the arbor F is journaled a second arbor, O, which near its upper end is provided with a pinion, o, that meshes with the wheel N, and upon its lower end, that projects through the back plate, C, has secured a toothed wheel, o', which meshes with a pinion, f, upon the contiguous projecting end of said arbor F, the arrangement being such as to cause the motion of the latter to be communicated to the sleeve M, and to give, preferably, to said sleeve one revolution for each fifty revolutions of said arbor. Of course the relative speed of said parts may be varied as desired to suit the special purposes for which the device is constructed.

The relative proportions of the threaded spindle or worm H and toothed wheel G cause the former to make one hundred revolutions for each revolution of the latter, and by placing upon the front plate, D, a dial, P, that has upon its face two suitably-graduated circles, p and p', the movements of said spindle will be indicated by the passage of the hands L and L' over the graduations.

In order that the spindle H may be connected with and caused to revolve by a rotating part which is to be timed, a boss, a, is provided at one point upon the periphery of the case A, and within such boss is journaled a spindle, Q, that extends into the interior of said casing in a line axially with said spindle H. Upon the inner end of said spindle Q is loosely fitted a sleeve, R, which is free to slide thereon within certain limits, but is caused to rotate therewith by means of a pin, q, that projects radially from the former into a longitudinal slot or groove, r, within the latter.

The inner end of the sleeve R is provided with two radial grooves, r', that are relatively arranged at right angles, and each of which is adapted to engage with the contiguous flattened end h of the spindle H when said sleeve is moved longitudinally inward, and when thus engaged operate to connect said spindle H with the spindle Q, so as to cause the former to be rotated by the latter. The clutch-sleeve R is moved longitudinally by means of a plate, S, which is adapted to slide upon the back plate, C, in a line with the former, and has its outer end turned upward into engagement with an annular peripheral groove, $r^2$, that is provided in said sleeve.

To the inner end of the plate S is pivoted a lever, T, which has one end pivoted upon the back plate, C, so that by moving the free end of said lever said plate will be moved longitudinally. A spring, t, impinging upon said lever, holds the same and its connecting parts, with a yielding pressure, in such position as to prevent the clutch-sleeve R from engagement with the spindle H, while for the purpose of enabling said parts to be engaged, when desired, a push-pin, U, extends inward through the periphery of the case A, and has its inner end connected with said lever. As thus arranged, by pushing said pin inward said lever will be moved in the same direction, and with it will carry said plate S and clutch-sleeve R.

In order that the registering mechanism may always move in one direction, whichever way the part revolves that is being timed, the spindle Q is constructed with a detachable section, q', and a second spindle, Q', is journaled within the boss a, and connected with said spindle Q by means of two pinions, $q^2$ and $q^2$, one of which is secured upon each spindle and meshes with the other pinion. The inner end of the spindle Q' does not project into the casing A, and therefore has no connection with the operative mechanism contained therein, except through the spindle Q, while at its outer end said spindle Q' corresponds to the size and shape of the like portion of said spindle Q, and is adapted to receive and be engaged by the detachable section q'. It will be seen that said spindles thus connected revolve simultaneously in opposite directions, so that either can be employed as the driving-spindle as may be required by the direction in which the part to be timed rotates.

It is intended that the registering mechanism should be operated a certain time—preferably one-half minute—and then be automatically thrown out of engagement with the spindle Q, for which purpose the following mechanism is employed:

Journaled within the plates C and D, preferably at a point opposite to the worm-spindle H, is an arbor, V, upon the lower portion of which is a toothed wheel, v. A second arbor, W, provided with a pinion, w, and escape-wheel w', is journaled beside said arbor V in such position as to cause said pinion w to mesh with said wheel v. A third arbor, X, carrying an anchor-lever, x, is journaled in position to enable the pallets x' to engage the teeth of said escape-wheel, and a fourth arbor, Y, carrying a balance-wheel, y, occupies the necessary position with relation to said lever, the whole forming a time-train.

Upon the arbor V, above the wheel v, is journaled a sleeve, Z, that has secured to its lower end a bar, z, which is preferably formed of thin spring metal, and has such length as to cause one end to project to or slightly beyond the periphery of said wheel. Upon the end at one edge of said bar is formed a downward-turned lip, $z'$, which is adapted to engage with the teeth $v'$ of said wheel, so that when said sleeve is rotated in one direction said lip will engage with said teeth and move said wheel in the same direction, thereby causing the time-train to move, while when said sleeve is turned in the opposite direction said engaging lip will trip over said teeth without moving said wheel $v$.

The sleeve Z and its ratchet-bar $z$ are permitted to rotate a distance sufficient to cause the time-train to run a predetermined length of time—preferably one-half minute—and are held with a yielding pressure at the front limit of their motion by means of a spring, A', which is coiled around the upper portion of said sleeve, with one end attached to the latter and its opposite end connected with the front plate, D, or with some relatively stationary part, the arrangement being such that by moving said ratchet-bar to the rear limit of its motion said spring will be placed under tension and will operate to move the train until said ratchet-bar reaches the front limit of its motion.

The ratchet-bar $z$ is moved to the rear limit of its motion, so as to place the mainspring A' under tension, by means of a radial push-pin, B', which is adapted to move longitudinally a certain distance within a suitable guide, and is held at the outer limit of its motion with a yielding pressure by means of a spring, C'. From one side of said push-pin an arm, $b'$, projects laterally outward and engages with an arm, $z^2$, that projects radially from the sleeve Z, the arrangement being such that when said push-pin is at the outer limit of its motion its arm $b'$ is engaged by said arm $z^2$ as said ratchet-bar reaches the limit of its forward motion, while by pushing said pin to the inner limit of its motion said arm $b'$ will carry said arm $z^2$ in the same direction, so as to rotate said sleeve rearward and place said mainspring under tension.

In addition to the office described, the push-pin B' operates to return the hands L and L' to zero, for which purpose said pin has such length as to cause its inner V-shaped end, $b^2$, to engage with the heart-shaped cams $k$ and $m$ upon the sleeves K and M, and turn said cams, their sleeves, and said hands until the said pin end $b^2$ engages with the notch of each cam, all in the usual way.

It will be seen that by moving the push-pin B' to the inner limit of its motion the registering-hands will be set at zero and the mainspring of the time-train placed under tension; but it is necessary that said time-train should not commence its movements until the instant when, by the manipulation of the push-pin U, the registering mechanism is set in motion, and that the action of the latter should cease at the instant when the movement of said time-train ceases. Such results are obtained by the following means, viz: The lever T has such length as to cause its outer end to impinge upon the periphery of the main wheel $v$ of the time-train whenever said lever occupies its normal position, at which time one of the teeth of the former is engaged by a lug, $t'$, that is provided upon the end of the latter, where it operates to lock the time-train and prevent motion of the same. When the push-pin U is pushed inward to cause the engagement of the rotating spindle with the registering mechanism, such operation moves said lever out of engagement with said main wheel, so that said registering mechanism and time-train start into motion at the same instant. As the free end of the locking-lever moves out of engagement with the main wheel, it is engaged by a notch, $d$, that is formed within the contiguous side of a lever, D', which lever is pivoted at one end upon the plate C, and from thence extends inward beside the lug $t'$ of said lever, with its inner free end near to the sleeve Z. Said lever D' is, by means of a spring, E', held with a yielding pressure against said lug $t'$, and is thus ready to engage with the latter whenever the rearward movement of the lever T brings said lug opposite to the notch $d$, when it operates to lock said lever T in such position, so as to insure connection between the rotating spindle and registering mechanism, and to permit the time mechanism to act. When the time-train has run the predetermined length of time, a lug, $z^3$, engages with the inner free end of the lever D', and moves the same rearward until the lug $t'$ of the lever T is released from engagement with the notch $d$, when, by the action of the spring $t$, said lever T will be returned to its normal position, said lug $t'$ will engage with the main wheel $v$, so as to instantly arrest the motion of the time-train, and simultaneously therewith the rotating spindle will be disengaged from the registering mechanism.

In practice the registering-hands are set at zero and the mainspring of the time-train simultaneously placed under tension, after which the point of the rotating spindle is placed within a center mark in the end of the shaft to be timed, and when it revolves with the same velocity as said shaft the starting push-pin is pressed inward. The rotating spindle and registering mechanism are instantly connected and the time-train simultaneously started, and when, after the predetermined interval, said registering mechanism is automatically disconnected from said rotating spindle, the registering-hands will show the precise number of rotations made during such time.

It will be obvious that absolute accuracy is obtainable by use of this device without other care or attention than is necessary to insure the firm engagement of the end of the rotating spindle with the part to be timed before the registering mechanism is set in motion and until after such motion has ceased, while even an approximate accuracy is difficult to obtain by use of mechanism which depends in any degree upon the skill and carefulness of the user in noting the time when its operations commence or cease.

Having thus described my invention, what I claim is—

1. A speed-indicator in which are combined mechanism for registering the rotations of a spindle, mechanism for measuring time, and mechanism whereby, by the manipulation of one device, the registering-hands may be set at zero and the actuating-spring of the time-measuring mechanism simultaneously placed under tension, substantially as and for the purpose specified.

2. A speed-indicator in which are mechanisms for registering the rotations of a spindle and for measuring time, in combination with mechanism that, by the manipulation of one device, is adapted to simultaneously set the registering-hands at zero and to place under tension the spring employed for actuating the time-measuring mechanism, substantially as and for the purpose shown.

3. A speed-indicator which is provided with a spindle that is adapted to have its outer end engaged with a shaft or other part to be timed, and may be connected with and caused to actuate registering mechanism, in combination with a second similar spindle which is arranged parallel with said first spindle and connected therewith by two engaging gear-wheels having equal numbers of teeth, whereby when either spindle is rotated the other spindle will move simultaneously and with equal speed in the opposite direction, substantially as and for the purpose set forth.

4. In a speed-indicator, a time-train which is driven by means of a reciprocable spring-pressed bar that is journaled upon the main wheel-arbor and has its outer end adapted to engage with the toothed periphery of the main wheel, substantially as and for the purpose shown and described.

5. The combination of a spring-pressed lever adapted to engage with one of the wheels of the time-train, a spring-pressed lever or pawl adapted to lock the former out of engagement with said wheel, and a radial rotating arm that is adapted to release said locking lever or pawl, substantially as and for the purpose specified.

In testimony that I claim the foregoing I have hereunto set my hand this 15th day of January, A. D. 1887.

GEORGE S. HEATH.

Witnesses:
A. H. EDDY,
A. D. NEWTON.